United States Patent
Keggi et al.

(10) Patent No.: US 10,430,421 B2
(45) Date of Patent: Oct. 1, 2019

(54) RECOMMENDING CONTENT ITEMS IN A SOCIAL NETWORK USING DELAYED INTERACTION

(71) Applicant: Facebook, Inc., Menlo Park, CA (US)

(72) Inventors: John Graham Keggi, San Francisco, CA (US); Daniel Joseph Giambalvo, Seattle, WA (US); Mao Xue, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 353 days.

(21) Appl. No.: 14/585,085

(22) Filed: Dec. 29, 2014

(65) Prior Publication Data
US 2016/0188596 A1 Jun. 30, 2016

(51) Int. Cl.
| | |
|---|---|
| *G06F 16/2457* | (2019.01) |
| *G06F 16/9535* | (2019.01) |
| *G06Q 30/06* | (2012.01) |
| *G06Q 50/00* | (2012.01) |

(52) U.S. Cl.
CPC .... *G06F 16/24578* (2019.01); *G06F 16/9535* (2019.01); *G06Q 30/0631* (2013.01); *G06Q 50/01* (2013.01)

(58) Field of Classification Search
CPC .......... G06F 17/3053; G06F 17/30867; G06F 17/5009; G06F 17/30386; G06F 17/30864; G06F 17/30029
USPC ....... 707/758, 705, 723, 728, 732, 737, 755; 715/206, 826
See application file for complete search history.

(56) References Cited

U.S. PATENT DOCUMENTS

| | | | |
|---|---|---|---|
| 8,060,634 B1 | 11/2011 | Darnell et al. | |
| 8,631,068 B1 | 1/2014 | Jannink et al. | |
| 8,874,559 B1 * | 10/2014 | Karimzadehgan | G06F 17/3053 707/707 |
| 9,298,786 B1 * | 3/2016 | Wang | G06F 17/30867 |
| 9,471,671 B1 * | 10/2016 | Juang | G06F 17/30029 |
| 2008/0040673 A1 | 2/2008 | Zuckerberg et al. | |
| 2009/0049041 A1 * | 2/2009 | Tareen | G06F 16/24578 |
| 2009/0248833 A1 | 10/2009 | Frazier | |

(Continued)

OTHER PUBLICATIONS

United States Office Action, U.S. Appl. No. 13/747,714, dated May 20, 2015, 23 pages.

(Continued)

*Primary Examiner* — Jeff A Burke
*Assistant Examiner* — Kamal K Dewan
(74) *Attorney, Agent, or Firm* — Fenwick & West LLP

(57) ABSTRACT

When a user sees a content item presented by a social networking system, the user may select an option to save the content item. When a user saves a content item, views saved content items, or otherwise indicates a present interest in a particular saved content item, the system recommends one or more additional items for the users to consume or save based on the seed saved content item. To find the additional content items, the system identifies other users who also saved the seed item and then finds other content items that these other users also saved at a rate that is disproportionately higher than the global save rates for the content items (which may be normalized by opportunities to save the content). Relevance for content items in other contexts may also be determined based on content items that have been saved by a user.

23 Claims, 6 Drawing Sheets

(56) References Cited

U.S. PATENT DOCUMENTS

| | | |
|---|---|---|
| 2010/0088170 A1 | 4/2010 | Glore |
| 2010/0138416 A1 | 6/2010 | Bellotti |
| 2011/0055177 A1 | 3/2011 | Chakra et al. |
| 2011/0153412 A1* | 6/2011 | Novikov ............... G06Q 30/02 705/14.42 |
| 2011/0264736 A1* | 10/2011 | Zuckerberg ........... G06Q 30/02 709/204 |
| 2012/0159635 A1 | 6/2012 | He et al. |
| 2012/0166432 A1* | 6/2012 | Tseng ............... G06F 17/30867 707/728 |
| 2012/0173626 A1* | 7/2012 | Reis .................. G06Q 30/0241 709/204 |
| 2012/0185447 A1 | 7/2012 | Zhang et al. |
| 2012/0221559 A1* | 8/2012 | Kidron ............. G06F 17/30867 707/723 |
| 2013/0013418 A1* | 1/2013 | Novikov ............... G06Q 30/02 705/14.66 |
| 2013/0031162 A1* | 1/2013 | Willis ................. H04L 65/1069 709/203 |
| 2013/0031487 A1 | 1/2013 | Olsen et al. |
| 2013/0124539 A1* | 5/2013 | Lin ....................... G06Q 50/01 707/749 |
| 2013/0151610 A1 | 6/2013 | Schoen et al. |
| 2013/0268889 A1 | 10/2013 | Barak et al. |
| 2013/0290339 A1 | 10/2013 | LuVogt et al. |
| 2013/0302005 A1 | 11/2013 | Harwell et al. |
| 2013/0304822 A1 | 11/2013 | Tetreault |
| 2014/0344288 A1* | 11/2014 | Evans ............... G06F 17/30867 707/749 |

OTHER PUBLICATIONS

United States Office Action, U.S. Appl. No. 13/747,714, dated Nov. 6, 2014, 23 pages.

* cited by examiner

FIG. 2

RECOMMENDING CONTENT ITEMS IN A SOCIAL NETWORK USING DELAYED INTERACTION

BACKGROUND

This invention relates generally to interacting with content via a social networking system, and more particularly, to encouraging users to interact with previously presented content stored by a social networking system user.

Social networking systems present large amounts of content to their users. Examples of content presented by a social networking system include status updates, descriptions of actions performed by social networking system users, audio and video posts, new associations, advertisements, offers, activities, and other types of content. As social networking systems have an increasing number of users, there is an increasing amount of content for presentation to social networking system users, making it difficult for a user to review or interact with the amount of content presented by the social networking system. For example, when a user sees interesting content, the user be unable interact with the content when it is initially viewed (e.g., viewing a link at work to a video that the user wants to view at home) or may desire to view future updates to presented content item.

However, social networking systems frequently present content to users as a chronologically organized newsfeed. Typically, a social networking system presents a user with the most recent content item at the top of a page including the newsfeed and presents older content item at lower locations of the page. Thus, to interact with content previously presented by the social networking system, a user typically navigates through newly-presented content. As an increasing amount of new content is received, it becomes more difficult to navigate through the new content to identify a desired previously-presented content item, making it difficult for users to subsequently interact with previously-presented content.

SUMMARY

Users of social networking system may save a content item presented by the social networking system, allowing the users to more easily retrieve the content item from the social networking system. When the social networking system presents a content item to a user, an input option is presented for saving the content item, and accessing the input option allows the user to save the content item to the social networking for subsequent interaction. The social networking system presents a saved content item to the user at a later time, allowing the user to more easily retrieve and interact with the saved content item after its initial presentation. Saved content items may be presented to the user via any suitable channels. Examples of channels for presenting a saved content item include sending a notification of the saved content item to the user, including the saved content item into a newsfeed at a later time, maintaining a page of the social networking system including saved content items, or any other suitable communication channel.

A content item saved by a user may be presented to the user based on information about the user or about the saved content item. For example, if the social networking system receives location information associated with the user that is within a threshold distance of a location associated with the saved content item, the social networking system includes the saved content item in the user's newsfeed at a more recent time or otherwise presents the saved content item to the user. As another example, the user is presented with a saved content item based on the amount of time between a current time and the user's most recent interaction with the social networking system or based on an expected amount of interaction between the user and the social networking system.

The saved content item may also be used to score other content items or identify other content items that may be of interest to the user. Since saving content items is typically a private action and is not shared with other users, a user saving a content item can be a strong signal for the user's actual interest in the content item. In addition, users may consume (e.g., view or interact with) saved content in particular contexts. When a user saves a content item and when a user consumes a saved content item, a context is stored by the social networking system relating to that action. This context may include the device of the user, a time of day, and a location of the device. For example, during the evening the user may review saved videos or pictures, while in the morning the user may review saved articles or external webpages. These interactions by a user are used by the social networking system to improve the recommendations to a user.

For example, the social networking system may maintain data for content items saved by various users in the social networking system. With respect to a seed content item, the social networking system may determine other relevant content items based on the content items that are co-saved with the seed content item. To determine the relevance of these other content items, the social networking system determines the frequency that another content item is saved by users who also saved the seed content item. This frequency may be compared with the frequency that all users saved the other content item (e.g., the global popularity of saving that content item). The frequencies of saving the other content item may be adjusted by the number of opportunities to save the content item, such as the number of times that a "save" interface element was presented to users. The adjusted frequency is used to determine a relevance of the other content items to the seed content item. This relevance may be used to rank and select particular content items related to the seed content item, for example to suggest co-saved content items to a user that has just saved the seed content item. In addition, a relevance score for content items may be generated with respect to multiple seed content items, for example by combining the relevance scores generated by each seed content item.

In another improvement to recommendations based on the saved content, the saved content items are used to improve recommendations for a newsfeed, advertising selection, search results, or other situations in which content is ranked and selected for presentation to a user. The social networking system receives a request to generate a relevance score for content items in one or more of these situations. For example, a user may access a home page of the social networking system, which generates a request for content items to provide on the newsfeed of the social networking system. The social networking system determines the context of the user accessing. The context includes information about the user's operating environment and timing of the request. The context may include the time of day, the device a user is accessing the social networking system on, an application executing on the device that is accessing the social networking system, a location of the device, and other characteristics of the access. A set of eligible content items is identified to be scored for the user. The set of eligible content items may be provided in the request or determined based on recently posted or modified content items that are accessible to the user. The eligible content items may be scored by a scoring model that incorporates the context of the user's access along with the content items that have been saved by the user and the contexts in which those saved content items were later consumed by the user. In this way, the scoring for the content items may incorporate information about a user's actions to save and consume content items.

BRIEF DESCRIPTION OF THE DRAWINGS

FIG. 2 is an example interface for saving content items presented by a social networking system, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
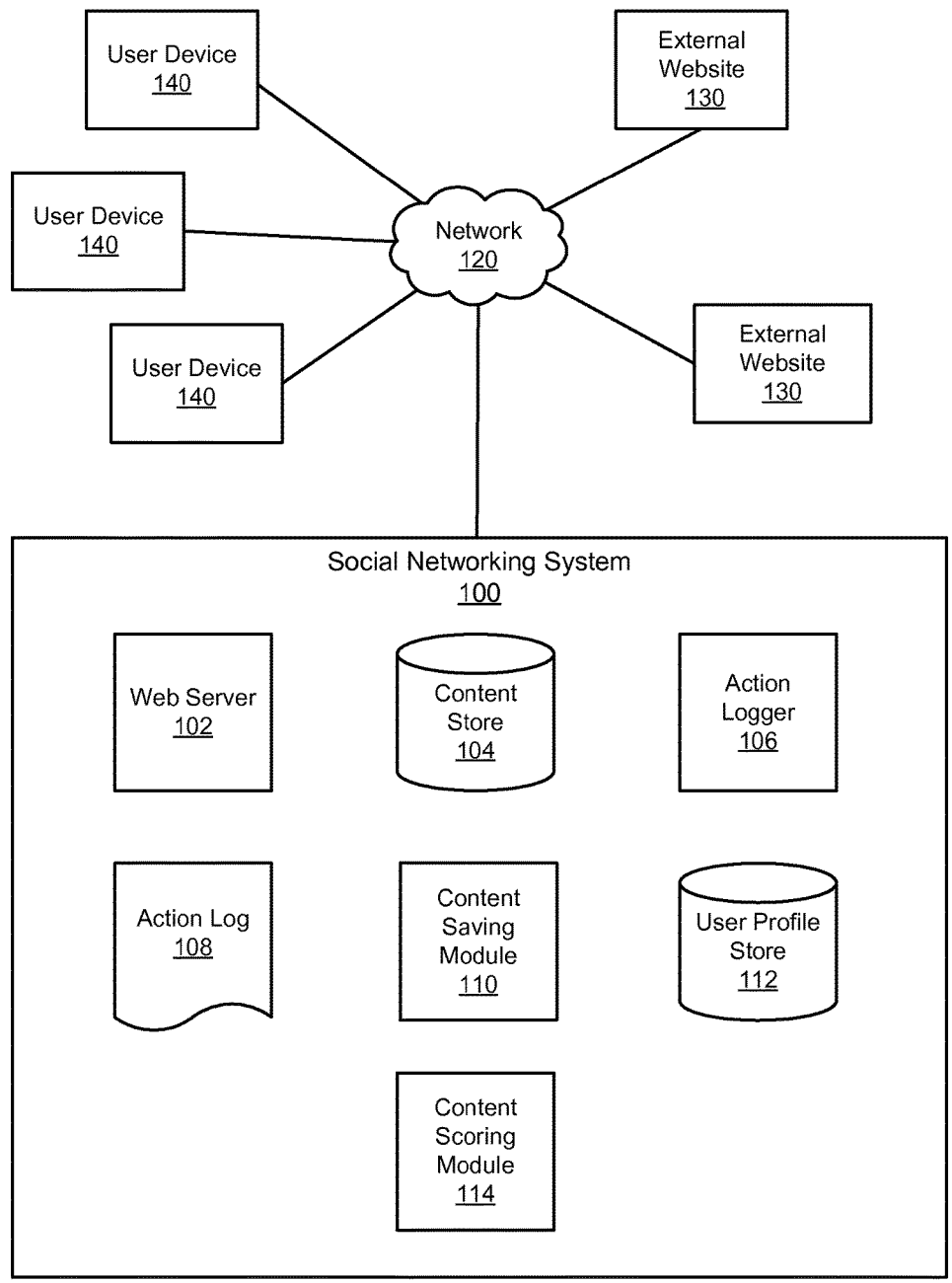
FIG. 1 is a block diagram of a system environment including a social networking system, according to one embodiment.

FIG. 1 is a block diagram of one embodiment of a system environment including a social networking system 100. The system environment shown by FIG. 1 includes one or more user devices 140, one or more external websites 130, a network 120, and the social networking system 100. In other embodiments, the system environment includes different and/or additional components than those shown by FIG. 1.

The social networking system 100 receives content items from users and allows users to establish connections to other users. Content items received from users are presented to other users via the social networking system 100, such as users connected to a user from which the content item was received. The social networking system 100 exchanges data with one or more user devices 140 and one or more user devices 140 through the network 120. FIG. 1 shows one embodiment of a social networking system 100 including a web server 102, a content store 104, an action logger 106, an action log 108, a content saving module 110, a user profile store 112, and a content scoring module 114. However, in other embodiments the social networking system 100 may include different and/or additional components than those shown in FIG. 1.

The web server 102 exchanges data between the social networking system 100 and one or more user devices 104 and/or one or more external websites 130. For example, the web server 102 receives requests from the user devices 140 and provides interfaces and content items to the user devices 140. Content items provided by the web server 102 may be selected by the social networking system 100 based on information associated with a user requesting the content items by the social networking system 100. This increases the likelihood of the user interacting with the provided content items. To provide content items to users, the web server 102 requests a relevance score for the content item from the content scoring module 114. In one embodiment, the web server 102 provides a newsfeed to the user device 140 requesting the content items. The newsfeed presents the content items or stories describing the content items in a chronological order.

In one embodiment, the newsfeed provided to the user device 140 includes one or more inputs allowing a user to save one or more of the presented content items via the social networking system 100. For example, an input is included in each story including a content item, allowing the user to access the input to save the story or the content item described by the story. As further described below, when a user stores a presented item via the social networking system 100, the social networking system 100 subsequently retrieves the saved content item for presentation to the user at a later time.

The web server 102 may also exchange data with one or more external websites 130. For example, a social plug-in included on pages provided by an external website 130 exchanges data with the web server 102, allowing the external website 130 to include information from the social networking system 100 along with the content from the external website 130 on the pages. Hence, a social-plug in presented on a page from an external website 130 may allow a user to save the page to the social networking system 100 as if the user were saving content presented via the social networking system 100.

The content store 104 stores objects representing various types of content items for presentation by the social networking system 100. Examples of content items represented by objects include a page post, a status update, a photo, a video, a link, a shared content item, a gaming application achievement, a check-in event at a local business, a brand page, or any other type of content. Objects may be created by users of the social networking system 100, such as status updates, photos, events, groups or applications; users may restrict or grant access to content items. In some embodiments, content items stored as objects are received from third-party applications, which may be separate from the social networking system 100. As used herein, a "content item" represents a single piece of content presented to social networking system users. Presenting content items to users increases user interaction with the social networking system 106 by encouraging users to post content items for presentation, increasing the interaction of users with each other and increasing the frequency with which users interact within the social networking system 100.

The action logger 106 receives communications about user actions on and/or off the social networking system 100 and populates the action log 108 with information describing these actions. Examples of actions include adding a connection to another user, sending a message to another user, uploading an image, reading a message from another user, viewing content associated with another user, attending an event posted by another user, among others. The social networking system 100 uses the action logger 106 and the action log 108 to track user actions on the social networking system 100, as well as on external websites that communicate information to the social networking system 100.

Users may interact with various objects on the social networking system 100, including commenting on posts, sharing links, and checking-in to physical locations via a mobile device, accessing content items or other interactions. Information describing these actions is captured by the action logger 106 and stored in the action log 108. Additional examples of interactions with objects on the social networking system 100 included in the action log 108 include commenting on a photo album, communications between users, becoming a fan of a musician, adding an event to a calendar, joining a group, becoming a fan of a brand page, creating an event, authorizing an application, using an application and engaging in a transaction. Additionally, the action log 108 records a user's interactions with advertisements on the social networking system 100 as well as other applications operating on the social networking system 100. In some embodiments, data from the action log 108 is used to infer interests or preferences of the user, augmenting the interests included in a user profile associated with the user and allowing a more complete understanding of user preferences.

The action log 108 may also store user actions taken on external websites. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, external websites 130, such as this sporting equipment retailer, may use the information about social networking system users accessing content from an external website 130. The action log 108 records data about these users, including webpage viewing histories, advertisements that were engaged, purchases made, and other patterns from shopping and buying.

Each user of the social networking system 100 is associated with a user profile, which is stored in the user profile store 112. A user profile includes declarative information about the user that was explicitly provided by the user, and may also include information inferred by the social networking system 100. In one embodiment, a user profile includes multiple data fields, with each data field describing one or more attributes of the corresponding user of the social networking system 100. Examples of information stored in a user profile includes biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 100 displayed in an image. A user profile in the user profile store 112 may also maintain references to actions by the corresponding user performed on content items in the content store 104 and stored in the action log 108 and references to connections to other users.

While user profiles in the user profile store 112 are frequently associated with individuals, allowing people to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system 100 using a brand page associated with the entity's user profile. Other users of the social networking system 100 may connect to the brand page to receive information posted to the brand page or to receive information from the brand page. A user profile associated with the brand page may include information about the entity itself, providing users with background or informational data about the entity associated with the brand page.

A user profile may also store a user profile list that defines a list of other user profiles. The user profile list can be created and updated by the user or automatically created and updated by the social networking system 100. For example, a user creates and updates a list of user profiles belonging to the user's close friends, family members, or co-workers. In another example, the social networking system 100 automatically creates and updates a list of users that attended the same university as the user. A user profile list may be used to identify content items associated with users on the user profile list for presentation to the user, allows the user to more easily interact with the users on the user profile list.

The content saving module 110 receives a request from a user to save a content item presented to the user by the social networking system 100. When a request to save a content item is received, the content saving module 110 includes data in the content store 104 indicating a user identifier of the user saving the content item. The content saving module 110 also identifies and stores the state of the content item when the request to save the content item was received. For example, a content item having 3 comments when a request to save it is received is saved in a state having 3 comments; hence, if additional comments are associated with the content item after it is saved, the saved content idem does not identify the additional comments. The additional comments may be identified by the content saving module 110 to differentiate between comments presented when the request to save the content item was received and comments provided after the content item was saved.

The content saving module 110 may store data describing the state of a saved content item or may include a reference to data in the content store 104 describing the saved content item and data describing the state of the saved content item when the request to save the content item was received. Based on information about the user providing the request to save the content item, the content saving module 110 retrieves and presents the saved content item to the user providing the request to save the content item. After a content item is saved, user interactions with the content item via the social networking system 100 may affect the state of the saved content item.

Saving a content item via the content saving module 110 allows a user to more easily interact with the saved content item by simplifying access to the saved content item. To encourage user interaction with the saved content item, the content saving module 110 may again present the saved content item to the user based on information associated with the user that saved the content item. For example, based on the time of day, the length of time a user interacts with the social networking system 100, location data associated with the user, the number of items the user has saved, or any other suitable information, the content saving module 110 may retrieve and present a saved content item to the user.

For example, the content saving module 110 retrieves a content item saved by a user if the user interacts with the social networking system 100 for at least a threshold amount of time, which may indicate that the user has sufficient time to review the saved content item as well as newly presented content items. In some embodiments, a saved content item may be retrieved based on time of day; for example, based on historical interactions with the social networking system 100, a user may interact with the social networking system 100 for a longer amount of time after a specified time of day, so a saved content item is retrieved and presented to the user after the specified time of day. In some embodiments, the content saving module 110 uses a behavioral model to determine user behavior and estimated length of the user's interactions with the social networking system 100 based on past activity and log-in times. If the behavioral model determines at least a threshold likelihood that the user will interact with the social networking system 100 for at least a threshold amount of time, a saved content item is retrieved and presented by the content saving module 110. Additionally, the length of time a saved content has been saved may also be used when retrieving and presenting a saved content item to the user that saved the content item.

Additionally, location information associated with a user may be used to retrieve and present saved content items to the user. In one embodiment, if the user is within a threshold distance of a location associated with a content item saved by the user, the saved content item is presented to the user. For example, a user saves an advertisement or offer from a retailer and when location information associated with the user is within a threshold distance of a location associated with the retailer, the saved advertisement is retrieved and presented to the user. A user device 140 may communicate location information to the social networking system 100 that may be associated with a user using the user device 140, subject to user privacy settings, and the content saving module 110 determines if the location information is within a threshold distance of a location associated with the saved content item. For example, a saved content item associated with a retailer is presented to the user if the user check-ins to a store operated by a retailer associated with a saved content item or another location near a store operated by the retailer. This allows the content saving module 110 provide a user with saved content pertinent to the user's location.

Saved content items may also be retrieved and presented to a user based on the user's interactions with external websites 130. For example, a user saving an offer from online retailer may visit an external website 130 associated with the online retailer that operates a social-plug in exchanging information with the social networking system 100. The social-plug in communicates information identifying the user and the user's interaction with the external website 130 to the social networking system 100, and the content saving module 110 may identify saved content items associated with the user and with the external website 130 based on the information. A saved content item identified by the content saving module 110 is communicated to the social plug-in operated by the external website 130 for presentation to the user along with content from the external website 130. In this example, the saved offer is presented to the user via the social plug-in while viewing content from the external website 130 to encourage the user to take advantage of the offer while accessing the external website 130.

User interactions with a content item may cause presentation of a saved content item to a user. After a user saves a content item, the content item is presented to additional users that may interact with the content item. These interactions may be identified by the content saving module 110, causing retrieval and presentation of the saved content item to the user. For example, if a specified user comments on the content item, if a threshold number of users comment on the content item, if a threshold number of users express a preference for the saved content item ("like" the content item), or any other suitable interaction is performed, the saved content item is retrieved and presented to the user by the content saving module 110. In one embodiment, the saved content item and a description of the interactions with the content item after it was saved are presented. Additionally, the number of content items saved by a user may be used to identify saved content items for presentation to the user; for example, if a threshold number of content items are saved, one or more saved content items may be selected for presentation to the user.

Saved content items may be subject to privacy settings specified by a user owning or otherwise administering the content items. A user may modify the privacy settings of a saved content item so that the saved content item is no longer accessible to the user that saved the saved content item. While the change in privacy settings prevents the saving user from being presented with the saved content item, the content saving module 110 may maintain an indication that content item is saved by the user. Hence, if the privacy settings of the saved content item modified are again modified to allow access to the user saving the content item, the saved content item may be presented to the user.

A saved content item may be presented to a user in a variety of ways. For example, the saved content item is presented by a notification to the user identifying the saved content item. Alternatively, the saved content item is inserted into the user's newsfeed at a more recent time, making it more accessible, or is presented using any suitable distribution channel. One or more saved content items may be accessible through a page dedicated to presenting the saved content items. The page may chronologically present content items saved by a user. In one embodiment, a user may identify specific types (e.g., videos, photos, status messages, etc.), so the page presents saved content items having the identified types. Content items saved by a user may also be added to categories, which may be accessed via the page.

As described above, other users may interact with a content item after the content item was saved by the user. For example, other users presented with the content item may comment on the content item, express a preference for the content item, share the content item with additional users, or perform any other interaction with the content item. Hence, the content saving module 110 may present a saved content item to a user based on the state of the saved content item when it was saved or may present the saved content item modified to include interactions between other users and the content item after it was saved. In one embodiment, interactions with the saved content after it was saved are visually distinguished from the state of the saved content item when it was saved.

The content scoring module 114 generates scores for content items to be presented to a user. The web server 102 may request content item scoring, for example, to select content items to present to a user in a newsfeed or advertisements that may be relevant to the user. The content scoring module 114 generates a relevance score based on saved content items and later consumption by users of the saved content items. The content scoring module 114 may also score content items on many additional factors, such as recency, relevance to a user's profile, interactions with the content item by a user's connections, and so forth. Thus, the final relevance score for a content item may be based on additional factors in addition to the relevance determined based on saved content items as described herein.

In one type of scoring, the content scoring module 114 identifies a set of content items relevant to a particular seed content item that has been saved by at least one user. For example, when a user saves a content item at the content saving module 110, in one embodiment the social networking system 100 presents additional content items to the user that may also be relevant to the user based on saving the content item. The saved content item is termed a seed content item for the relevance determination. To determine a set of content items, the content scoring module 114 identifies other users that also saved the seed content item and the content items that were saved by those users. These other content items that were also saved by users are termed co-saved content items. These co-saved content items are scored and ranked based on the relative frequency that users who saved the seed item also saved the co-saved content item relative to other users. From the ranked co-saved content items, at least a portion are selected and sent to a user, for example as recommendations after saving the seed content item. The scoring for these co-saved content items is further described with respect to FIG. 4.

In another type of relevance scoring, the content scoring module 114 incorporates saved content items in a scoring algorithm to determine relevance for a content item to provide to the user, for example in a newsfeed. Content items saved by a user indicate a user's intention to review the content item at a later time, and is typically not biased by the user's knowledge that actions on the social networking system may be seen by other users. Thus, saving a content item may provide a strong signal that the saved content item is of interest to the user. In addition, a content item that is later consumed by the user provides an even stronger signal. When a content item is saved and when a content item is consumed, the context in which a user performs these actions is saved in the action log 108 by the web server 102. The context indicates attributes of the user's state when the user performed the action. These attributes include, for example, where and when the user consumed the item as well as the device on which the user consumed the item. This context may be used to generate a profile for the user's consumption behaviors for saved content items, for example learning a behavioral model for when and where a user saves and/or consumes content items. To score the relevance of a content item, the content scoring module 114 determines the current context of the user and scores the content item based on the similarity of the content item to saved content items and a match between the user's current context and the behavioral model's prediction of a user's interaction with the content item based on the content item and the user's context. This behavioral model and related scoring is further described with respect to FIGS. 5 & 6.

The user devices 140 comprise one or more computing devices capable of receiving user input as well as transmitting and/or receiving data via the network 120. In one embodiment, the user device 140 is a conventional computer system, such as a desktop or laptop computer. Alternatively, a user device 140 may be a device having computer functionality, such as a personal digital assistant (PDA), mobile telephone, smart-phone, or similar device. The user device 140 is configured to communicate via the network 120. In one embodiment, a user device 140 executes an application allowing a user of the user device 140 to interact with the social networking system 100. For example, a user device 140 executes a browser application to exchange information between the user device 140 and the social networking system 100 via the network 120. In another embodiment, a user device 140 interacts with the social networking system 100 through an application programming interface (API) that runs on the native operating system of the user device 140, such as IOS® or ANDROID™.

Information is communicated between the user devices 140, the social networking system 100 and/or the one or more external website 130 via the network 120, which may comprise any combination of local area and/or wide area networks, using both wired and wireless communication systems. In one embodiment, the network 120 uses standard communications technologies and/or protocols. Thus, the network 120 may include communication links using technologies such as Ethernet, 802.11, worldwide interoperability for microwave access (WiMAX), 3G, 4G, CDMA, digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of the communication links may be encrypted using conventional encryption technologies such as secure sockets layer (SSL), transport layer security (TLS), and Internet Protocol security (IPsec).

User Interface

Figure 2:
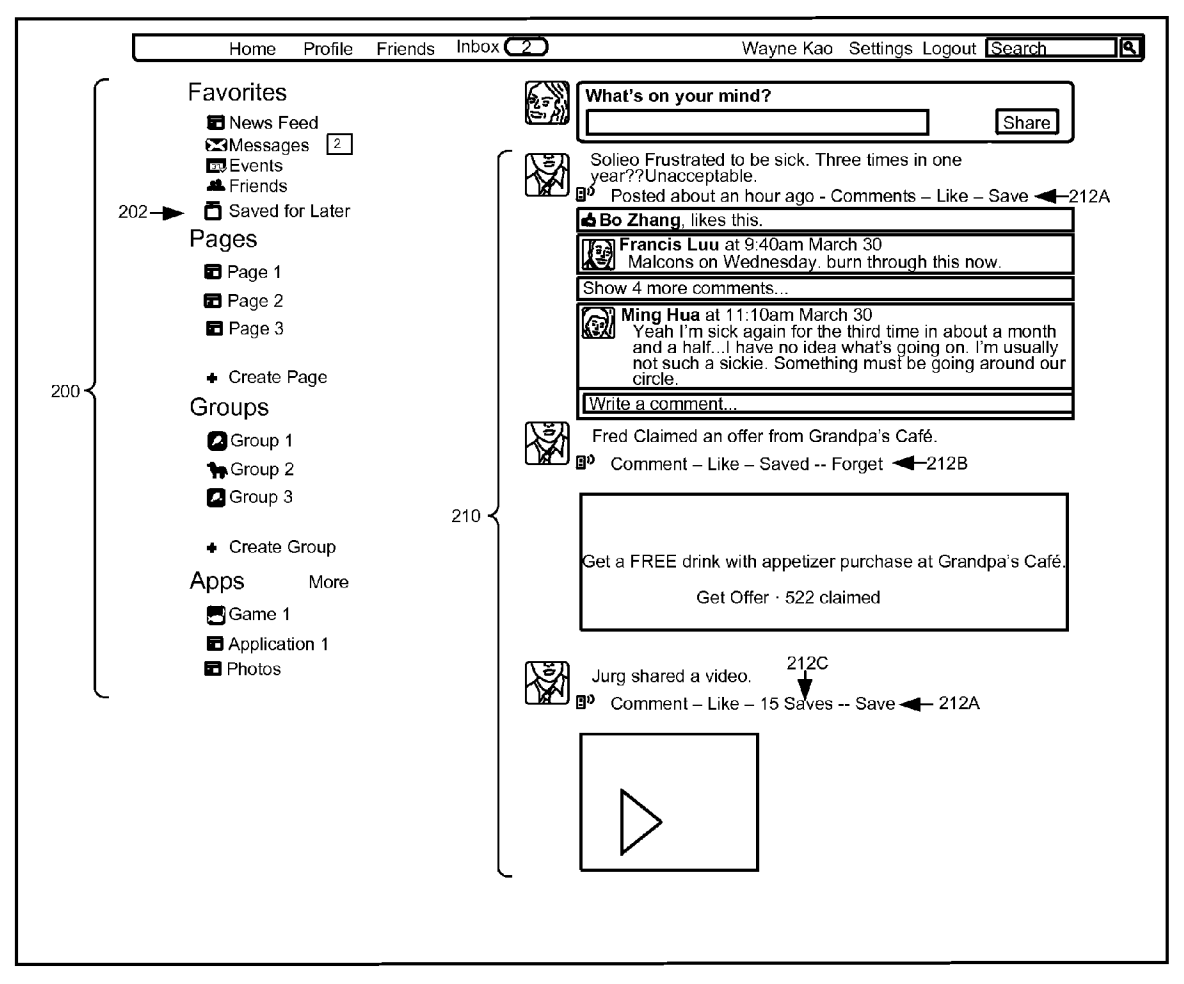

FIG. 2 illustrates an example interface for social networking system users interacting with saved content items. The interface shown by FIG. 2 includes a selection region 200 and social content 210. The selection region 200 allows a user to retrieve various content items maintained by the social networking system 100. For example, the selection region 200 identifies different types of content items, and selecting a portion of the selection region 200 presents content having the type corresponding to the selected portion is presented in the social content 210. The selection region 200 includes an option for accessing saved content, identified as a saved for later option 202 in FIG. 2. If the saved for later option 202 is selected, the content saving module 110 retrieves content items saved by the user.

The social content 210 retrieved from the content store 104 and communicated to a user device 140, along with instructions for generating the interface, by the web server 102. Various inputs for receiving input from a user to interact with the social content 210 are included in the interface. For example, inputs allow a user to comment on a content item shown in the social content 210, express a preference for a content item shown in the social content 210, or otherwise interact with content items shown in the social content 210. A save input 212A allows a user to select a content item to be saved by the content saving module 110. In one embodiment, an indication 212B that a content item has previously been saved is presented in place of the save input 212A. In some embodiments, the save input 212A includes additional information 212C. For example, the additional information 212C may identify the conditions used to determine when to present the saved content item to the user. As another example, the additional information 212C may identify the number of times the content item has been saved by other users or has been saved by other users connected to the user viewing the social content 212.

Presentation of Content Items Saved by a Social Networking System User

Figure 3:
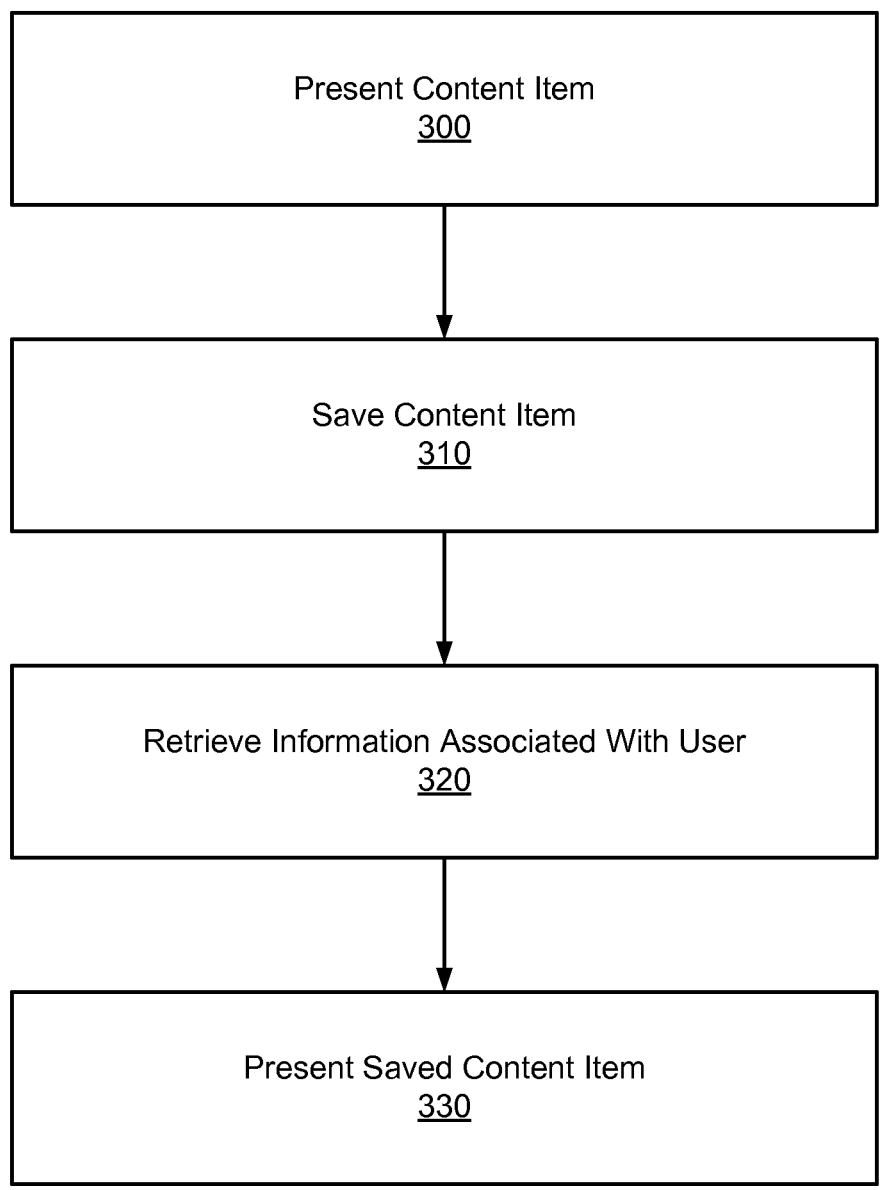
FIG. 3 is a flow chart for a method of providing saved content items, according to one embodiment.

FIG. 3 is a flow chart for a method providing saved content items, according to one embodiment. In one embodiment, the method illustrated in FIG. 3 is performed through content saving module 110, although in other embodiments, the method may be performed by any component or combination of components of the social networking system 100. One or more content items are presented 300 to the user by the social networking system 100. The user identifies a content item to save and communicates an identification of the content item to the social networking system 110, which saves 310 the identified content item. In one embodiment, the state of the content item is saved 310, allowing identification of changes to the content item after it was saved 310.

Subsequently, the content saving module 110 retrieves information 320 about the user that saved the content item. Based on the retrieved information, the content saving module 110 presents 330 the saved content item to the user at a time after it was saved. As described above in conjunction with FIG. 1, various types of information associated with the user may be retrieved and used to determine when to present 330 the saved content item to the user. For example, the retrieved information is an action from the user requesting to view a page including saved content items. As another example, the retrieved information is location information associated with the user, which is compared to location information associated with the saved content item, as described above in conjunction with FIG. 1. The saved content item may be presented 330 to the user in a variety of ways. For example, the saved content item may be inserted into a newsfeed presented to the user in a location associated with a more recent time or may be presented 330 using a notification sent to the user.

Scoring Co-Saved Content Items

Figure 4:
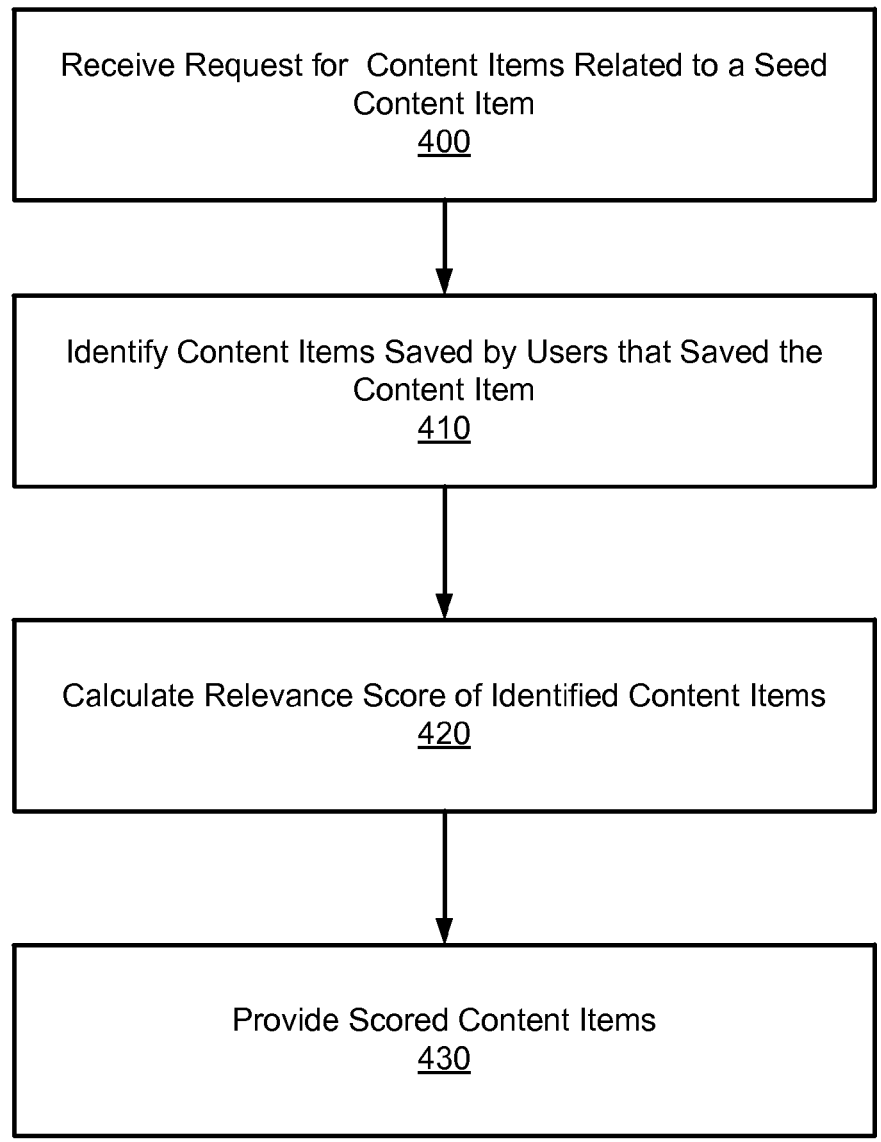
FIG. 4 shows an example method for scoring co-saved content items according to one embodiment.

FIG. 4 shows an example method for scoring co-saved content items according to one embodiment. This method determines content items co-saved with a seed content item and a relevance score of the co-saved content items to users that co-saved the content item relative to a population of users. This method is implemented in one embodiment by the content scoring module 114 and may be responsive to the selection of a seed content item by the user (e.g., to save the seed content item) or by the web server 102 (to present the seed content item).

Initially, a request 400 is received for content items related to a saved seed content item. The request may designate a viewing user of the social networking system that will receive the scored content items. The seed content item has already been saved by at least one user on the social networking system 100. Next, the content scoring module 114 identifies users that saved the seed content item.

For each of the users that saved the seed content item, the content scoring module 114 identifies 410 content items that were also saved by the users in addition to the seed content item to generate a set of co-saved content items. The set of co-saved content items may be filtered based on the viewing user by determine whether the viewing user is permitted to view the content items. Certain content items may have privacy settings or, for advertisements, targeting criteria, that are not matched by characteristics of the viewing user, in which case these content items are excluded from the set of co-saved content items. In addition, the co-saved content items may be filtered to exclude content items of a dissimilar type to the seed content item. For example, the content items may be events, articles, or videos.

The filtering of content items may also exclude content items based on where the content items are hosted. For example, content items located at external sites to the social networking system may be excluded from the co-saved recommendation scores.

In another embodiment, the request specifies a set of co-saved content items that comprises other content items that have been saved by the user. The relevance scoring may be generated based on this list, for example to generate recommended content items from among the content items that have also been saved by the user.

Next, for each of the co-saved content items, the content scoring module 114 calculates a relevance score for the co-saved content items relative to the seed content item. To score a co-saved content item, the content scoring module 114 determines a group of users that saved the seed content item, and within that group, the portion of users that saved the seed content item and also saved the co-saved content item. These users are compared to determine a percentage $P_S$ of users that saved the co-saved content item and also saved the seed content item. This percentage reflects the popularity of the co-saved content item among the users that saved the seed content item. The content scoring module 114 also determines the percentage $P_C$ of users from among a general population of users that saved the co-saved content item. This percentage $P_C$ reflects the popularity within the general population of the co-saved content item. The content scoring module 114 calculates 420 the relevance score by dividing the popularity of the co-saved content item of among the users that saved the seed content item by the popularity among the general population. Stated another way, by determining a ratio of $P_S$ to $P_C$.

In one embodiment, the group of users in each group is adjusted to account for actual opportunities presented to users to save the co-saved content item. Some users may view the co-saved content item or be presented with an opportunity to save it, while other users may view the co-saved content item several times without saving it. When a content item was presented to a user and if the content item was presented with an opportunity to save the content item is stored in the action log 108. Thus, the various groups of users may be filtered to exclude those users that were never presented the content item or presented an opportunity to save the content item. In addition, the percentage may also be weighed based on the number of times that the content item was presented to users without prior to being saved. In this way, the percentages and the relevance score for the co-saved content item may reflect the actual views of the content item and opportunity to save the content item.

After calculating a relevance score for each of the co-saved content items, the scored content items are provided 430 to the web server 102, which may provide some of the scored co-saved content items to a user device 140 for the user.

The relevance score described above may also be generated with respect to several seed content items for a subject content item. For example, the web server 102 may provide the content scoring module 114 with each of the seed content items and the subject content item. The content scoring module 114 generates a relevance score based on the relative popularity of the subject content item co-saved with respect to each of the seed content items. Each of the relevance scores associated with each seed content item is combined to determine the relevance of the content item to the group as a whole. The relevance scores may be combined in any suitable way, for example by addition or averaging.

Figure 5:
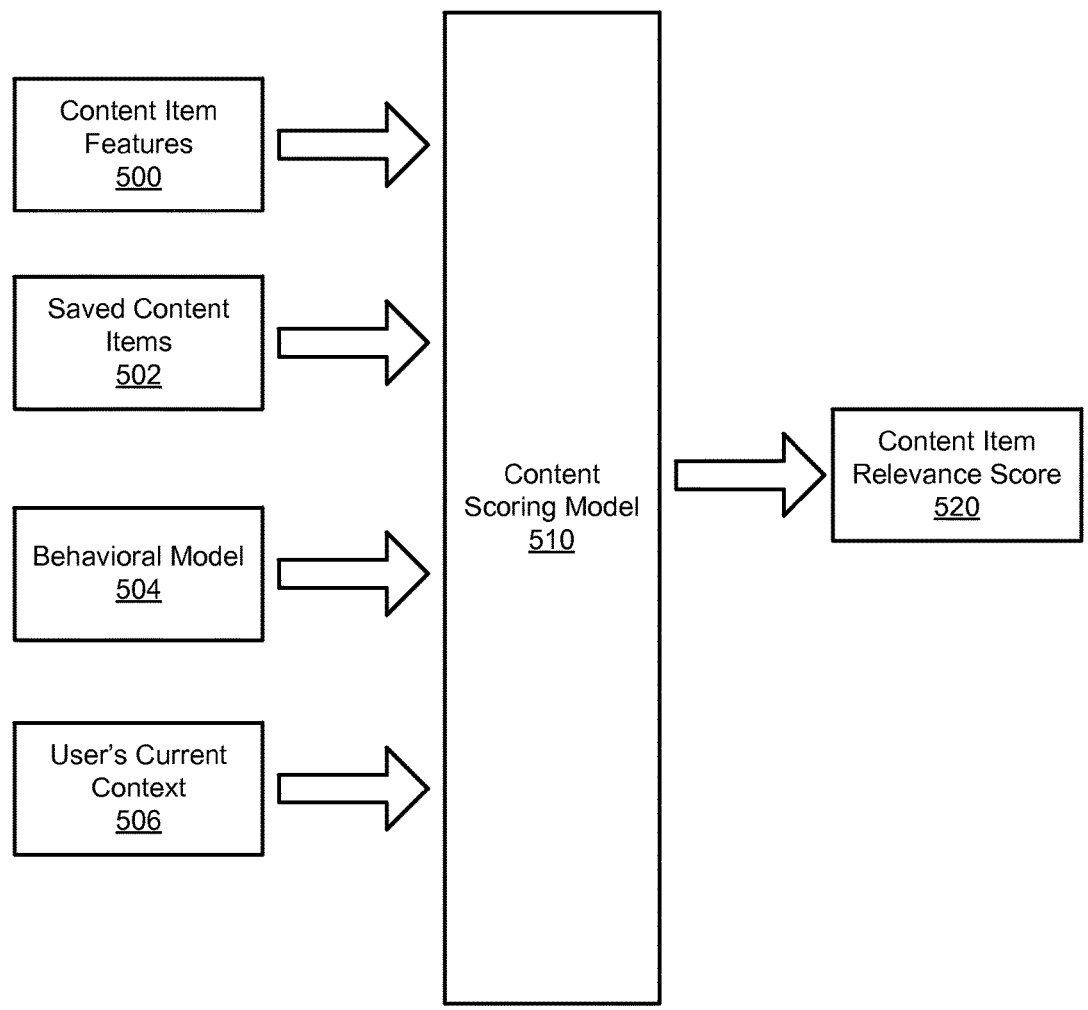
FIG. 5 illustrates using saved content items to improve recommendation scores for additional content items according to one embodiment.

FIG. 5 illustrates using saved content items to improve recommendation scores for additional content items according to one embodiment. In this example, a content scoring model 510 is used to score a content item and determine a content item relevance score 520 for the content item for presentation to a user. The content scoring model 510 in one embodiment is a trained computer model that receives the various inputs described below and outputs the content relevance score 520. This content scoring may be used to identify content items for presentation in a newsfeed, in advertisements, as search results, and so forth to identify and rank relevant content. In this example, the content scoring model 510 accounts for information provided by a user's interactions with saved content, though the content scoring model 510 may account for many other types of information known to the social networking system, such as the user's interests and affinities, interactions with content items, connections of the user, and so forth. Thus, the content scoring model 510 and content item relevance score 520 may use saved content items as described herein as one component among many considerations for the content item relevance score 520.

To determine the content item relevance score 520, the content scoring model 510 in one embodiment accounts for content item features 500, other saved content items 502 by the user, a behavioral model of consumption 504, and a user's current context 506.

The content item features 500 represent types of information known about the content item. The types of information may specify the type of content item, the source of the content item (e.g., the author), terms associated with the content item (e.g., the words in the content item), metadata associated with the content item, topics associated with the content item (e.g., by analysis of the terms associated with the content item), a link in the content item, and other aspects of a content item.

Saved content items 502 include other content items that have been saved by the user. The saved content items may also be associated with features like those for the content item being evaluated.

The behavioral model 504 is a profile of the user's behaviors in consuming content items on the social networking system 100. In particular, the behavior model 504 is trained based on the saving and consuming of content items. The context of a user is stored when a user saves or consumes a content item. The context of a user indicates the time, location, device, and so forth of a user's interaction with a content item. The behavioral model 504 predicts, given a context and a content item, a likelihood that the user will consume that content item. The behavioral model 504 may be a profile of the user's interactions with saved and consumed content items, or the behavioral model 504 may be a trained computer model. In one embodiment, the trained behavioral model 504 is incorporated into the content computer model 510.

The content scoring model 510 receives the content item features 500, saved content items 502, behavioral model 504, and the user's current context 506, and generates the content item relevance score 520. In one embodiment, the content scoring model 510 accounts for saved content items 502 that were actually consumed by the user. When the content item is similar to the consumed content items, the weight accorded to the consumed content item is accorded greater weight in generating the content item relevance score 520 relative to saved content items 502 that have not yet been consumed.

In one embodiment, the content item relevance score 520 predicts the likelihood that the user will interact with the content item. In this embodiment, the relevance content scoring model 510 is trained using user interactions with content items as outputs in a training set for the content scoring model 510.

Figure 6:
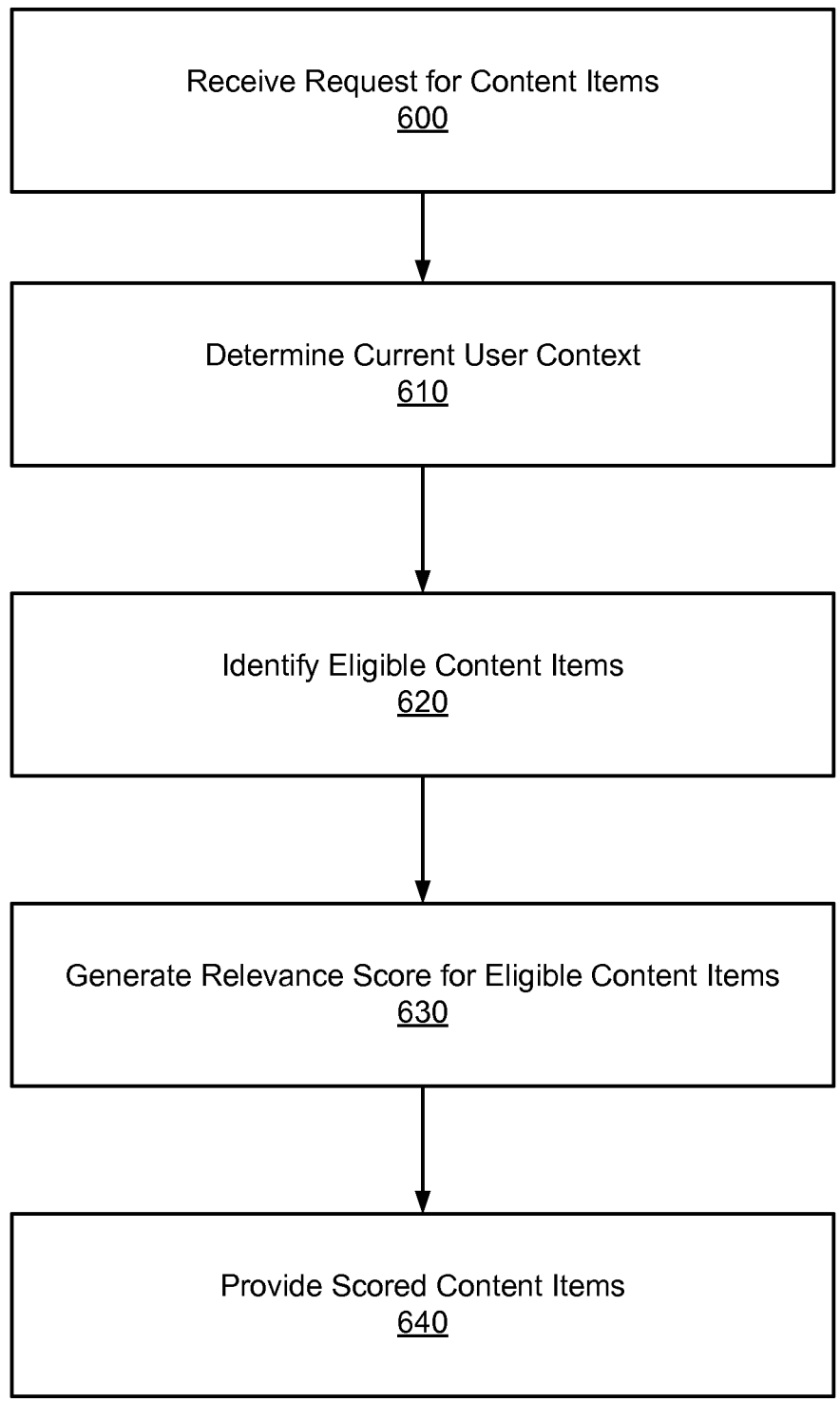
FIG. 6 shows a flow chart for generating a relevance score for a set of content items according to one embodiment.

FIG. 6 shows a flow chart for generating a relevance score for a set of content items according to one embodiment. This flow may be performed, for example, by the web server 102. The web server 102 receives 600 a request to for content items, for example by a user accessing the web server 102 for content at the social networking system 100. Next, the web server 102 determines 610 the current user context. The user context may be provided in the request, or the web server 102 may determine the context, for example by querying the user device for device information or location information of the user. The content scoring module 114 identifies 620 eligible content items to be scored. The content items to be scored may be selected from content items accessible to the user based on privacy settings of the content items and based on the particular inputs of the user in accessing the web server 102. As example user inputs, a user may access a page or enter a search query. The content items to be scored are selected from content items associated with the page, are deemed responsive to the search query or otherwise responsive to the user inputs or interactions of the user with the social networking system 100.

Next, a relevance score for each content item is generated 630 based in part on content items saved by the user. To generate the relevance score, the content item and user's context are provided to the content scoring module 114 for scoring by the content scoring model 510. Using the relevance scores, a portion of the eligible content items are selected and provided 640 to the user device 140. In this way, the content items saved by the user can be used in the selection of other content items for the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    providing content items for display to users of a social networking system, wherein at least some of the content items are displayed with an input option providing the users an opportunity to save the content item for subsequent presentation to the users that saved the content item;
    receiving a request to save content items from users presented with the opportunity to save the content items;
    receiving a request for content items related to a seed content item in the social networking system;
    identifying a set of users that saved the seed content item;
    identifying a set of co-saved content items that are also saved by the set of users that saved the seed content item;
    for each co-saved content item of the set of co-saved content items, calculating a relevance score for the co-saved content item with respect to the seed content item by:
        for a first population of users that were provided with an opportunity to save the co-saved content item and were not provided with an opportunity to save the seed content item, identifying a first percentage of the first population of users that saved the co-saved content item,
        for a second population of users that saved the seed content item and were provided with an opportunity to save both the co-saved content item and the seed content item, identifying a second percentage of the second population of users that saved the co-saved content item, and
        calculating the relevance score for the co-saved content item based on a comparison of the first percentage of the first population of users with the second percentage of the second population of users;
    ranking the co-saved content items based on the relevance scores of the co-saved content items;
    selecting one or more of the co-saved content items based on the ranking; and
    providing the selected one or more co-saved content items for display to a user.

2. The method of claim 1, wherein the received request for content items is associated with a user of the social networking system, and the method further comprises filtering the set of co-saved content items to exclude content items that are not accessible to the user based on privacy settings of the content items.

3. The method of claim 1, further comprising filtering the set of co-saved content items to exclude content items that do not match a content type of the seed content item.

4. The method of claim 3, wherein the content type comprises events, articles, or videos.

5. The method of claim 1, further comprising filtering the set of co-saved content items to exclude content items stored by the social networking system.

6. The method of claim 1, further comprising filtering the set of co-saved content items to exclude content items stored at an external system to the social networking system.

7. The method of claim 1, wherein the request for content items is received responsive to a user saving the seed content item.

8. The method of claim 1, wherein the request for content items is received responsive to a user interacting with the seed content item.

9. The method of claim 1, wherein the request for content items is received responsive to a user selecting the seed content item in a list of saved content items, and the method further comprises filtering the set of co-saved content items to exclude content items that are not in the list of saved content items.

10. A method comprising:
    providing content items for display to a user of a social networking system, wherein at least some of the content items are displayed with an input option providing the user an opportunity to save the content item for later consumption;
    receiving a request to save content items from the user presented with the opportunity to save the content items;
    receiving a request to determine the relevance of a seed content item to the user; and
    generating a relevance score based on the similarity of the seed content item to the content items saved by the user.

11. The method of claim 10, further comprising receiving a context of the user, the context describing at least one of a time, a location of the user, and a device of the user; and wherein generating the relevance score is further based on the context of the user.

12. The method of claim 11, further comprising generating a behavioral model of user behaviors based on user consumption of the saved content items, and wherein generating the relevance score based on the context of the user is based on the behavioral model.

13. The method of claim 12, wherein the behavioral model is a trained computer model.

14. The method of claim 10, further comprising identifying one or more content items of the saved content items that were consumed by the user; wherein generating the relevance score comprises increasing a weighting of the one or more consumed content items.

15. A non-transitory computer-readable medium comprising instructions for execution on a processor, the instructions causing the processor to perform steps of:
    providing content items for display to users of a social networking system, wherein at least some of the content items are displayed with an input option providing the users an opportunity to save the content item for subsequent presentation to the users that saved the content item;

receiving a request to save content items from users presented with the opportunity to save the content items;

receiving a request for content items related to a seed content item in the social networking system;

identifying a set of users that saved the seed content item;

identifying a set of co-saved content items that are also saved by the set of users that saved the seed content item;

for each co-saved content item of the set of co-saved content items, calculating a relevance score for the co-saved content item with respect to the seed content item by:

for a first population of users that were provided with an opportunity to save the co-saved content item and were not provided with an opportunity to save the seed content item, identifying a first percentage of the first population of users that saved the co-saved content item, for a second population of users that saved the seed content item and were provided with an opportunity to save both the co-saved content item and the seed content item, identifying a second percentage of the second population of users that saved the co-saved content item, and calculating the relevance score for the co-saved content item based on a comparison of the first percentage of the first population of users with the second percentage of the second population of users;

ranking the co-saved content items based on the relevance scores of the co-saved content items;

selecting one or more of the co-saved content items based on the ranking; and providing the selected one or more co-saved content items for display to a user.

16. The non-transitory computer-readable medium of claim 15, wherein the received request for content items is associated with a user of the social networking system, and the method further comprises filtering the set of co-saved content items to exclude content items that are not accessible to the user based on privacy settings of the content items.

17. The non-transitory computer-readable medium of claim 15, the steps further including filtering the set of co-saved content items to exclude content items that do not match a content type of the seed content item.

18. The non-transitory computer-readable medium of claim 17, wherein the content type comprises events, articles, or videos.

19. The non-transitory computer-readable medium of claim 15, the steps further comprising filtering the set of co-saved content items to exclude content items stored by the social networking system.

20. The non-transitory computer-readable medium of claim 15, the steps further comprising filtering the set of co-saved content items to exclude content items stored at an external system to the social networking system.

21. The non-transitory computer-readable medium of claim 15, wherein the request for content items is received responsive to a user saving the seed content item.

22. The non-transitory computer-readable medium of claim 15, wherein the request for content items is received responsive to a user interacting with the seed content item.

23. The non-transitory computer-readable medium of claim 15, wherein the request for content items is received responsive to a user selecting the seed content item in a list of saved content items, and the method further comprises filtering the set of co-saved content items to exclude content items that are not in the list of saved content items.

* * * * *